ated Mar. 20, 1956

2,739,097
COMPOSITION FOR THE TREATMENT OF DEMODECTIC MANGE

William C. Ward, Norwich, N. Y., assignor, by mesne assignments, to The Norwich Pharmacal Company, Norwich, N. Y., a corporation of New York No Drawing. Application October 31, 1951, Serial No. 254,204

2 Claims. (Cl. 167—53.2)

This invention relates to veterinary compositions and aims to provide an improved chemotherapeutic composition adapted for use in the treatment of diseases of the skin of animals.

It is a particular object of this invention to provide a chemotherapeutic composition which will effectively combat demodectic mange in animals.

Demodectic mange is caused by mites (demodex) which burrow down into the hair follicles of an animal, causing irritation. A proliferation and desquamation of epidermal cells ensues upon the skin surface. This permits invasion of the affected area by bacteria or fungi, or both. Pustulation which follows may cause a general septicemia or toxemia; progressive emaciation occurs in the animal; and a peculiar disagreeable odor is emitted. Ultimately, if the process is not interrupted, death takes place.

Demodectic mange is quite prevalent in dairy cattle during those months when herds must be stabled. When a herd becomes infested with this affliction, the owner may suffer serious economic injury: Cows become debilitated, with a consequent decrease below normal milk production, and lack of early diagnosis and treatment may result in the deaths of the afflicted animals. In the case of household pets afflicted with this disease, there is not only a general impairment of the health of the animal, but the attendant odor is most obnoxious.

Demodectic mange has been peculiarly resistant to successful treatment in the past. The agents which were used to combat demodectic mange prior to my invention required a long drawn-out series of treatments which, more often than not, were unsuccessful, especially if the demodicosis was of the pustular form wherein there were present secondary bacterial or fungal invaders. I have discovered that demodectic mange, even in the pustular form wherein secondary bacterial or fungal invaders are present, can be combatted, that animals afflicted therewith can be cured in a surprisingly brief time, and that the revolting odor attendant upon this affliction can be suppressed by treating the afflicted animals with a solution, in a non-ionic, surface-active base, of very small quantities of 5-nitro-2-furfuryl methyl ether and p-diisobutyl cresoxyethoxyethyl dimethyl benzylammonium chloride and a small quantity of benzyl benzoate. I prefer to add to the above composition water in sufficient quantity to provide a free-flowing liquid which can be applied to the infected areas of the skin of animals under treatment by spraying or by brushing.

The chemotherapeutic composition which I have invented can be handled very easily. It is non-staining, its surface-active base solubilizes water-insoluble components such as benzyl benzoate and 5-nitro-2-furfuryl methyl ether, readily releases the medication dissolved therein, permits an effective spreading on the site of the infection, and adheres closely to the skin upon which it is applied.

The chemotherapeutic composition which I prefer to use in the practice of my invention is formulated as follows:

| | Percent |
|---|---|
| 5-nitro-2-furfuryl methyl ether | 0.4 |
| p-Diisobutyl cresoxyethoxyethyl dimethyl benzyl ammonium chloride | 0.5 |
| Benzyl benzoate | 15.0 |
| Sorbitan monolaurate polyoxyethylene ether having about 20 oxyethylene groups per mol | 60.0 |
| Water | 24.1 |

While the veterinary composition which I have invented can be used with particular advantage in combatting demodectic mange, it is not limited thereto. I have found that it can be used with surprisingly good results in the treatment of other skin afflictions in animals such as sarcoptic and psoroptic mange and lends itself well to the treatment of infections of bacterial or fungal nature.

What I claim is:

1. A chemotherapeutic composition adapted to combat demodectic mange in animals, comprising about 0.4 part of 5-nitro-2-furfuryl methyl ether, about 0.5 part of p-diisobutyl cresoxyethoxyethyl dimethyl benzyl ammonium chloride, about 15.0 parts of benzyl benzoate, and about 60.0 parts of sorbitan monolaurate polyoxyethylene ether having about 20 oxyethylene groups per mol.

2. A chemotherapeutic composition adapted to combat demodectic mange in animals, comprising about 0.4 part of 5-nitro-2-furfuryl methyl ether, about 0.5 part of p-diisobutyl cresoxyethoxyethyl dimethyl benzyl ammonium chloride, about 15.0 parts of benzyl benzoate, about 60.0 parts of sorbitan monolaurate polyoxyethylene ether having about 20 oxyethylene groups per mol, and about 24.1 parts of water.

References Cited in the file of this patent

UNITED STATES PATENTS 2,206,520    Tisdale _____ July 2, 1940

OTHER REFERENCES

Milks: Veterinary Pharmacology, Materia Medica and Therapeutics, 6th edition (1949), pgs. 593, 594.

New and Nonofficial Remedies (Jan. 1, 1951), pgs. 83 to 86.

Ward: Journal of the American Pharmaceutical Association, Scientific edition, vol. 37, Aug. 1948, pgs. 317 to 319.

Rawlins: Journal of the American Pharmaceutical Association, Scientific edition, volume 32 (1943), pgs. 11 to 16 (167-QA Digest).

Modern Drug Encyclopedia, 4th edition (1949), pg. 256.

Milks: Veterinary Pharmacology Materia Medica and Therapeutics, 6th edition (1949), pgs. 348.

Drug and Cosmetic Emulsions (1946), pg. 43.